US010082020B2

United States Patent
Wisniewski et al.

(10) Patent No.: US 10,082,020 B2
(45) Date of Patent: Sep. 25, 2018

(54) ACOUSTIC DIPOLE PISTON TRANSMITTER

(71) Applicant: HALLIBURTON ENERGY SERVICES, INC., Houston, TX (US)

(72) Inventors: Laurence T. Wisniewski, Houston, TX (US); Gary L. Fickert, Houston, TX (US); Michael Simmons, Houston, TX (US); Gary Kainer, Houston, TX (US); Chung Chang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 71 days.

(21) Appl. No.: 15/109,444

(22) PCT Filed: Oct. 24, 2014

(86) PCT No.: PCT/US2014/062214
§ 371 (c)(1),
(2) Date: Jul. 1, 2016

(87) PCT Pub. No.: WO2016/064421
PCT Pub. Date: Apr. 28, 2016

(65) Prior Publication Data
US 2016/0326868 A1    Nov. 10, 2016

(51) Int. Cl.
*G01V 1/40* (2006.01)
*E21B 47/14* (2006.01)
(Continued)

(52) U.S. Cl.
CPC .............. *E21B 47/14* (2013.01); *E21B 28/00* (2013.01); *E21B 31/005* (2013.01);
(Continued)

(58) Field of Classification Search
CPC ............. G01V 1/145; G01V 1/52; G01V 3/28
See application file for complete search history.

(56) References Cited

U.S. PATENT DOCUMENTS 4,507,579 A * 3/1985 Turner ................... H02K 33/14
                                                             310/15
4,862,991 A    9/1989 Hoyle et al.
(Continued)

OTHER PUBLICATIONS

PCT Search Report for PCT Application No. PCT/US14/62214 dated Aug. 20, 2014.
(Continued)

*Primary Examiner* — Ian J Lobo
(74) *Attorney, Agent, or Firm* — Locke Lord LLP; Daniel Nguyen; Alexander Viderman

(57) ABSTRACT

According to embodiments of the disclosure, a downhole tool for taking acoustic measurements in a wellbore is provided. The tool may have an acoustic dipole transmitter with a piston made from a soft magnetic material, mounted on a centering spring between the first coil and the second coil, which moves the piston bi-directionally along a longitudinal axis when energized. The tool may also have a feedback winding on at least one of the first or second coils. The tool may also have a circuit for energizing the first and second coils which includes an input for receiving a signal responsive to the position of the piston relative to the coils and a processor for determining an output waveform used to generate an acoustic signal.

18 Claims, 8 Drawing Sheets

(51) Int. Cl.

| | |
|---|---|
| *G01V 1/52* | (2006.01) |
| *E21B 28/00* | (2006.01) |
| *E21B 31/00* | (2006.01) |
| *E21B 47/00* | (2012.01) |
| *E21B 49/00* | (2006.01) |
| *G01V 1/145* | (2006.01) |
| *G01V 1/02* | (2006.01) |

(52) U.S. Cl.
CPC .......... *E21B 47/0005* (2013.01); *E21B 49/00* (2013.01); *G01V 1/145* (2013.01); *G01V 1/159* (2013.01); *G01V 1/52* (2013.01)

(56) References Cited

U.S. PATENT DOCUMENTS

| | | | | |
|---|---|---|---|---|
| 5,036,945 | A | * | 8/1991 | Hoyle ..................... G01V 1/52 |
| | | | | 181/102 |
| 5,831,934 | A | * | 11/1998 | Gill .......................... G01V 1/48 |
| | | | | 367/25 |
| 6,474,439 | B1 | | 11/2002 | Hoyle et al. |
| 2005/0022987 | A1 | | 2/2005 | Green et al. |
| 2007/0235184 | A1 | | 10/2007 | Thompson et al. |
| 2011/0204896 | A1 | | 8/2011 | Zhang et al. |

OTHER PUBLICATIONS

PCT Written Opinion for PCT Application No. PCT/US14/62214 dated Aug. 20, 2014.

\* cited by examiner

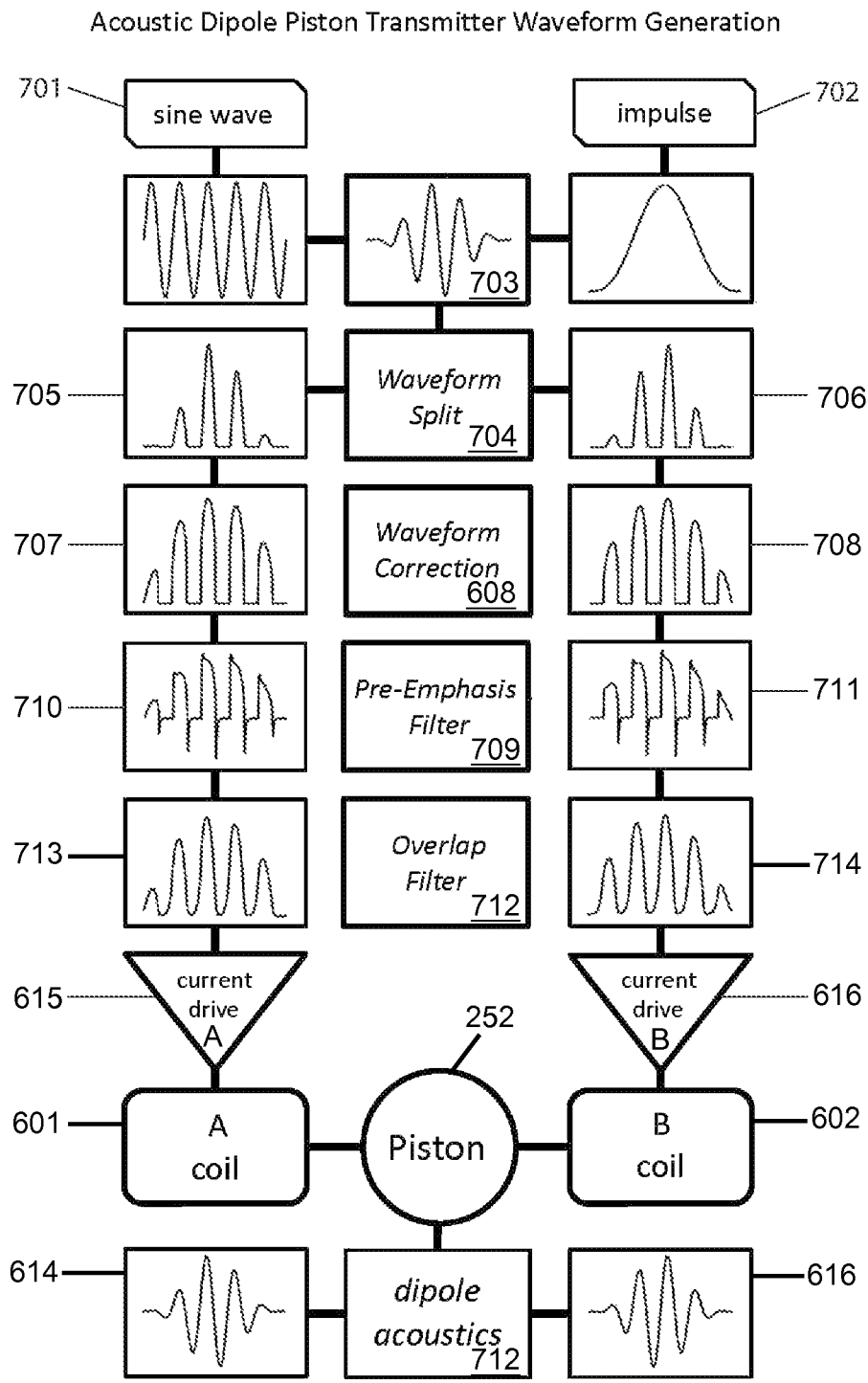

ACOUSTIC DIPOLE PISTON TRANSMITTER

TECHNICAL FIELD

The embodiments disclosed herein relate generally to acoustic logging tools used in logging while drilling (LWD) and wireline logging applications, and in particular to acoustic logging tools for producing low frequency dipole waves using a piston-based dipole transmitter.

BACKGROUND

Sonic, or acoustic, tools are used in the oil and gas industry to measure the travel time of a compressional wave as it travels through a subterranean formation. Acoustic logging tools may also measure shear and velocity waves which may be useful in understanding the rock mechanical properties. Acoustic logs may also be used to determine porosity, lithography, and types of fluid in the bore hole, and to evaluate geo-mechanical subterranean rock properties. For LWD and wireline acoustic logging tools, it is generally desirable to produce acoustic dipole waves emitting from the tool at a broad range of frequencies, including low frequencies down to 250 Hz or even lower. The acoustic dipole waves travel through a wellbore and the subterranean formation and may be observed at an array of receivers arranged on the tool, typically about three to eight feet from the acoustic transmitter.

BRIEF DESCRIPTION OF DRAWINGS

FIG. 7 is a diagram illustrating acoustic dipole waveform generation according to one or more embodiments.

DETAILED DESCRIPTION OF DISCLOSED EMBODIMENTS

As an initial matter, it will be appreciated that the development of an actual, real commercial application incorporating aspects of the disclosed embodiments will require many implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the disclosure.

Figures 1A, 1B:
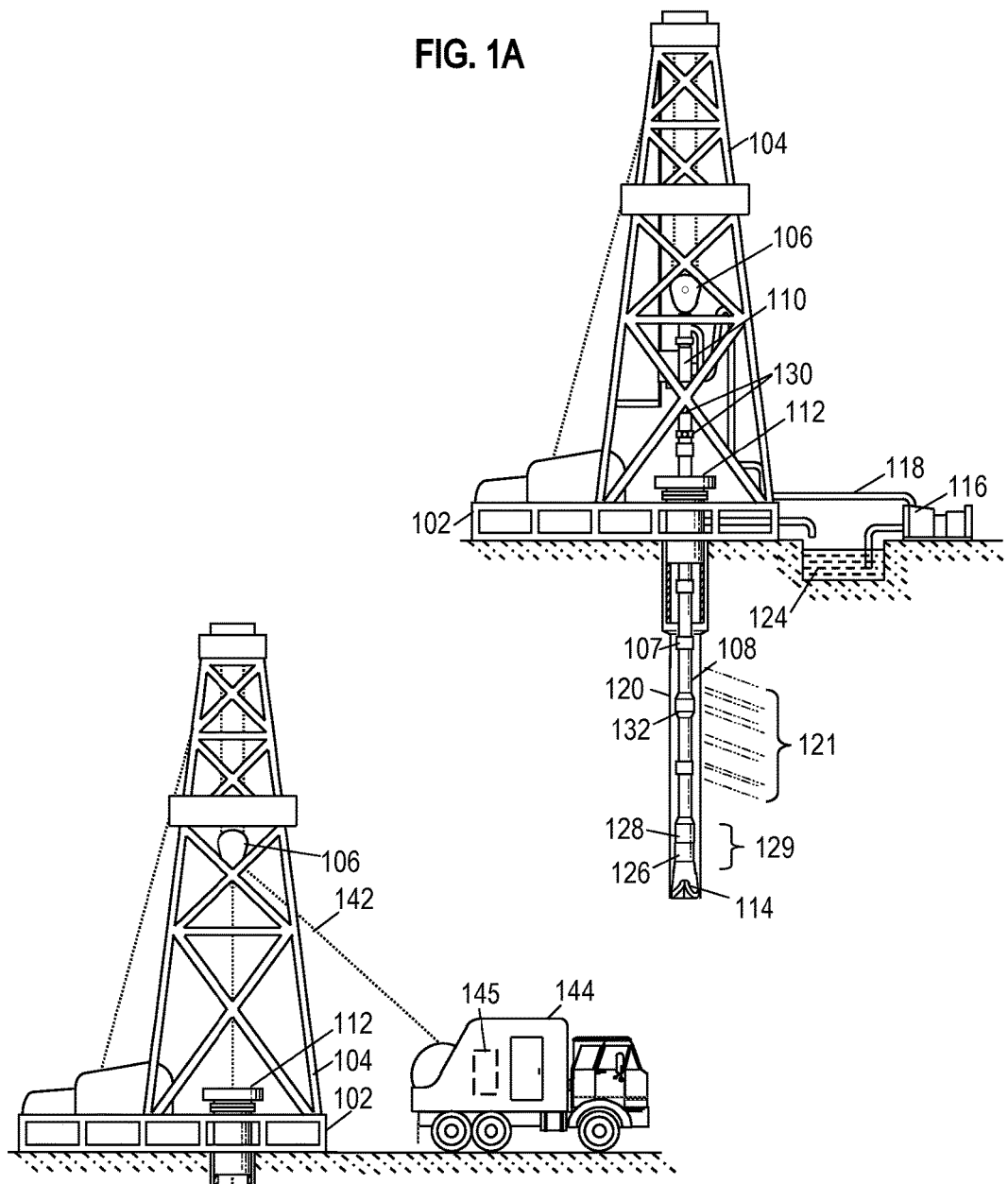
FIGS. 1A and 1B are diagrams illustrating an LWD application and a wireline logging application, respectively, in which a downhole acoustic tool according to one or more embodiments may be used.

As mentioned above, the embodiments disclosed herein relate generally to acoustic logging tools used in LWD and wireline logging applications. FIGS. 1A and 1B illustrate examples of LWD and wireline logging applications, respectively, where the acoustic logging tools disclosed herein may be used. Referring first to FIG. 1A, a typical LWD application includes a drilling platform 102 equipped with a derrick 104 that supports a hoist 106 used for raising and lowering a drill string 108 composed of sections of drill pipes connected to one another by threaded connectors 107. The hoist 106 supports a top drive 110 that rotates the drill string 108 as the string is lowered through a well head 112. The drill string 108 may be extended by temporarily anchoring it at the well head 112 and using the hoist 106 to position and attach new sections of drill pipe to the drill string 108.

A bottom-hole assembly 129 is connected to the lower end of the drill string 108 for rotating a drill bit 114. As drill bit 114 rotates, it creates a borehole 120 that passes through various subterranean formations 121. A pump 116 circulates drilling fluid through a supply pipe 118 to the top drive 110, down the interior of the drill string 108, through orifices in the drill bit 114, back up an annulus around the drill string 108, and into a retention pit 124 at the surface. The drilling fluid transports cuttings from the borehole 120 into the retention pit 124 and aids in maintaining the integrity of the borehole 120.

A logging tool, indicated generally at 126, may be integrated into the bottom-hole assembly 129 near the drill bit 114. As the drill bit extends the borehole 120 through the subterranean formations 121, the bottomhole assembly 129 obtains various information using the logging tool 126, such as tool orientation and position, borehole size, drilling fluid resistivity, and other drilling parameters.

In wells employing acoustic telemetry, downhole sensors like the logging tool 126 may be coupled to a telemetry module 128 having an acoustic telemetry transmitter that transmits telemetry signals in the form of acoustic vibrations in the drill string 108. An acoustic telemetry receiver array 130 may be coupled to the top drive 110 to receive transmitted telemetry signals. One or more repeater modules 132 may be provided along the drill string 108 to receive and retransmit the telemetry signals. Other telemetry techniques may also be employed, including mud pulse telemetry, electromagnetic telemetry, and wired drill pipe telemetry.

FIG. 1B shows the borehole 120 with the drill string 108 removed. Logging operations may then conducted using a wireline logging tool, indicated generally at 134, instead of the LWD/MWD logging tool 126. The wireline logging tool 134 is typically suspended by a cable 142 having conductors that carry power to the tool 134 and also carry communications from the tool 134 to surface equipment. Centralizing arms 136 are used to center the wireline logging tool 134 within the borehole 120. A wireline logging facility 144 collects measurements from the wireline logging tool 134. The wireline logging facility 144 includes computing facilities 145 for processing and storing the measurements gathered by the logging tool 134.

In accordance with the disclosed embodiments, the LWD logging tool 126 and/or the wireline logging tool 134 may be, or may include, an acoustic logging tool. The disclosed acoustic logging tool may then be used, for example, to measure shear and velocity waves, determine porosity, lithography, and types of fluid in the bore hole, evaluate geo-mechanical subterranean rock properties, and the like.

In some embodiments, the acoustic logging tool may have an acoustic dipole transmitter with a piston made at least partially from a soft magnetic material. The piston may be mounted on a centering spring between a first coil and a second coil that move the piston bi-directionally along a longitudinal axis when energized.

The acoustic logging tool may also have a feedback winding on at least one of the first or second coils and a circuit for energizing the first and second coils. The circuit may include an input for receiving a signal responsive to the position of the piston relative to the coils and a processor for determining an output waveform used to generate an acoustic signal. The first and second coils may be driven in a manner to compensate for non-linearities and other factors needed to produce a linear, smooth acoustic signal. This eliminates the need for a permanent magnet in the acoustic dipole transmitter in some embodiments.

In general operation, the piston is pulled first in one direction by energizing the first coil and then pulled in the opposite direction by energizing the second coil. The coils allow for higher magnetic flux density and, therefore, greater pulling force on the piston. The greater force results in higher acceleration of the piston, which produces higher acoustic output. Driving first one coil and then the other achieves a linear drive in which the acoustic output can reproduce the desired drive signal electrical input, although this may require more complex electronics than if some of the drive force were provided by a permanent magnet. Also, in some implementations the piston may be operated in oil, and substantial power may be required to "squeeze out" the oil in the gap compared to typical solenoid operation in air.

One or more embodiments may include piston position sensors and an additional or second feedback winding on the first or second coils. Both first and second feedback windings allow continuous monitoring of the piston operation and adjustment of the drive signal shape and amplitude to achieve the desired operation.

Still further embodiments provide an apparatus and method to reduce unwanted acoustic energy from radiating from a housing, which would degrade the modal purity of the desired dipole acoustic radiation, including an acoustic barrier installed over the housing having cutouts for the piston to radiate acoustic energy therethrough. This acoustic barrier may include a thin rubber layer covered by a thin metal layer in some embodiments.

Figure 2A:
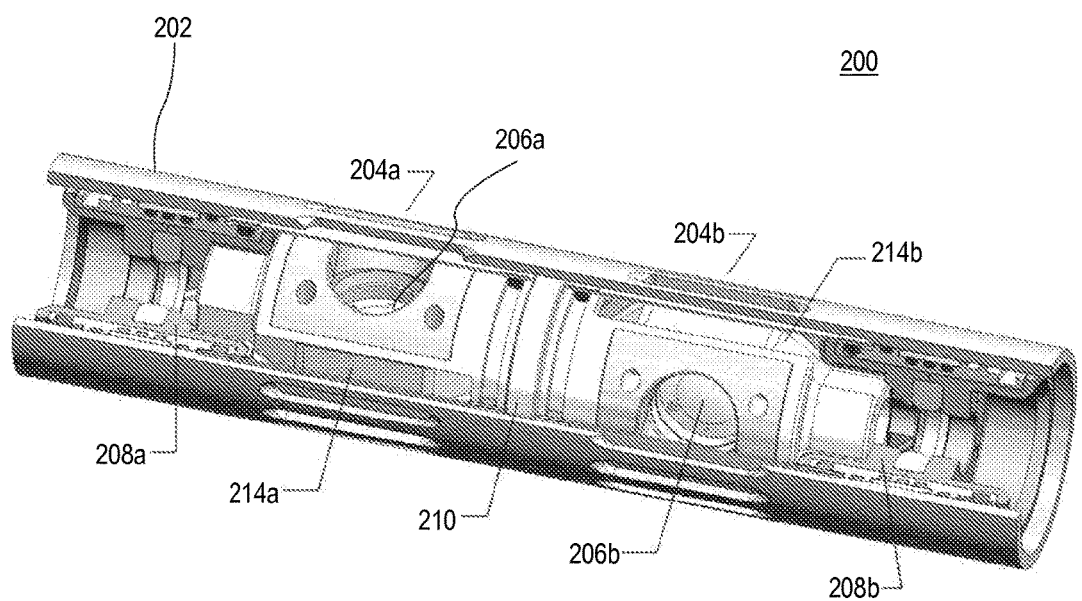
FIGS. 2A and 2B are diagrams illustrating a dipole acoustic transmitter according to one or more embodiments.
Figure 2B:
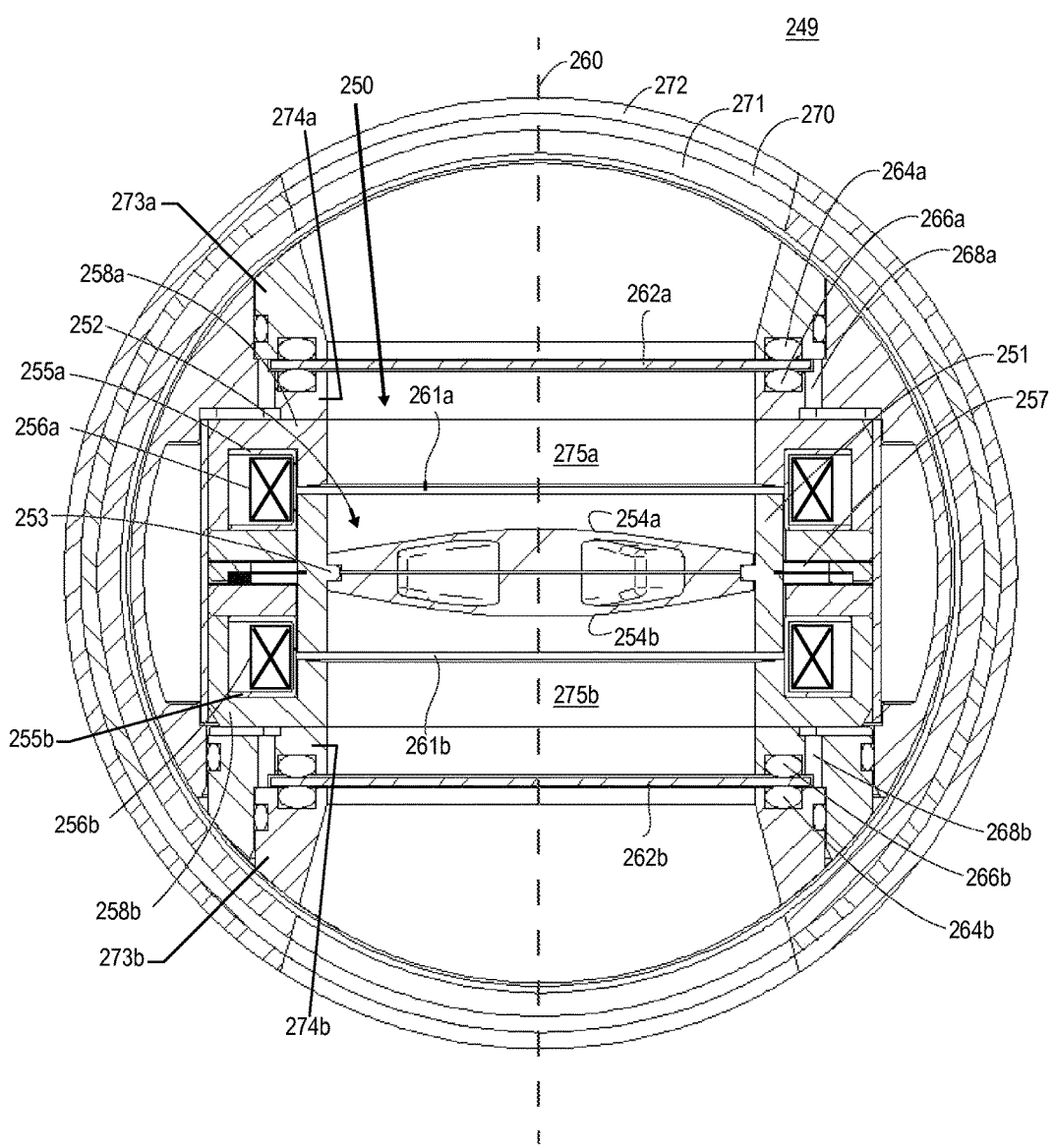

FIGS. 2A and 2B illustrate an exemplary downhole acoustic logging tool and an exemplary dipole transmitter for the tool, respectively, that may be used in the LWD/MWD and wireline logging applications of FIGS. 1A and 1B. Referring first to FIG. 2A, an exemplary acoustic tool 200 according to one or more disclosed embodiments typically includes a tubular tool body 202 designed to enter a wellbore and to attach to other components in a drill string. The tool 200 in the implementation shown here contains two acoustic transmitters 204a and 204b, with their dipole acoustic transmission angles arranged at an angle of about 90° to each other. The dipole transmitters 204a, 204b are housed in a transmitter frame 210.

Rubber isolators 208a and 208b may be disposed within the tool body 202 so as to bookend the acoustic transmitters 204a, 204b. These rubber isolators 208a, 208b serve to prevent unwanted acoustic signals from traveling through the tool body 202 and impinging on the acoustic transmitters 204a, 204b, which may cause unwanted noise in the desired acoustic signal.

Each of the dipole transmitters 204a, 204b contains corresponding transmitter pistons 206a and 206b. In one or more embodiments, the pistons 206a, 206b, are generally disk shaped, with each side or face of the disk serving as an acoustic transmission surface. The dipole transmitters 204a, 204b may employ a "pull-pull" design that uses solenoid coils to move the transmitter pistons 206a, 206b. When the transmitters 204a, 204b are energized, the transmitter pistons 206a, 206b are pulled and forth along a longitudinal axis that is normal to the faces of the pistons to generate acoustic waves.

FIG. 2B illustrates in more detail an example of an acoustic tool 249 having an acoustic dipole transmitter 250 according to one or more embodiments. The transmitter 250 includes a transmitter piston 252, which may be an assembly composed of a hollow, metal housing cylinder 251 and first and second piston surfaces 254a and 254b that oppose one another. The first and second piston surfaces 254a, 254b are mounted at about a mid-point of the housing cylinder 251 on an inner surface of the housing cylinder 251. The housing cylinder 251 may be advantageously made from a soft magnetic material such as Vacoflux-50® or Hiperco-50®. The soft magnetic material provides the transmitter piston 252 with a small hysteresis loop that may help to avoid wasting energy when reversing the piston's movement.

The first and second piston surfaces 254a, 254b of the transmitter piston 252 act to transmit sonic vibrations into the wellbore, according to one or more embodiments. These opposing piston surfaces 254a, 254b may be convex with respect to the wellbore, although flat, or other surface shapes may be used in other embodiments. The surfaces 254a, 254b may be fabricated to provide a high stiffness-to-weight ratio. This reduces or eliminates self-resonance in the surfaces 254a, 254b that may cause unwanted frequencies to appear in the acoustic signal generated by the transmitter piston 252. The piston surfaces 254a, 254b may be mounted to the inner surface of the piston cylinder 251, for example, by engagement with inner rim 253.

Figure 3A:
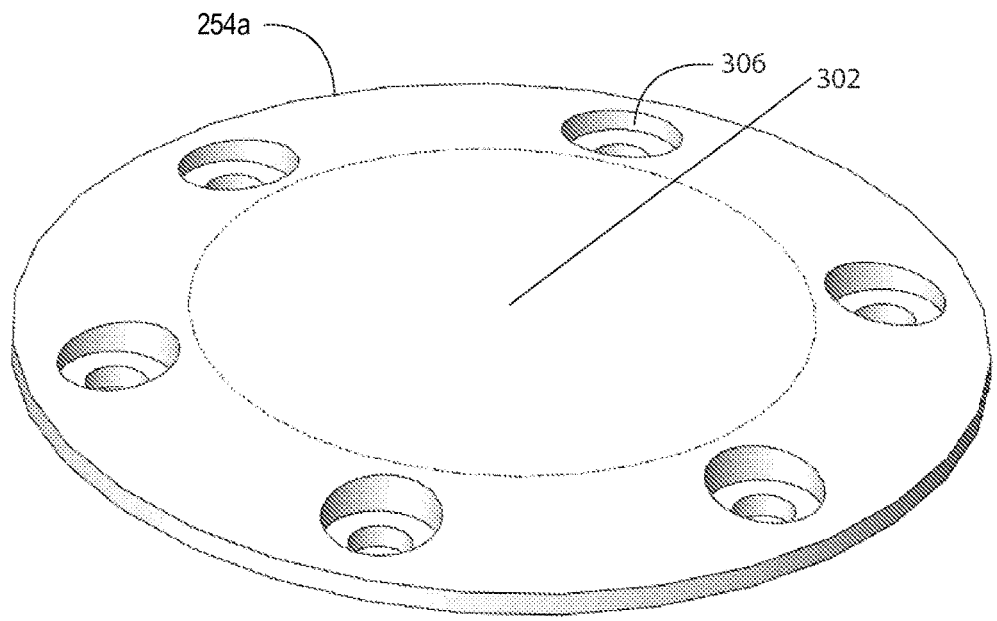
FIGS. 3A and 3B are diagrams illustrating a piston surface according to one or more embodiments.
Figure 3B:
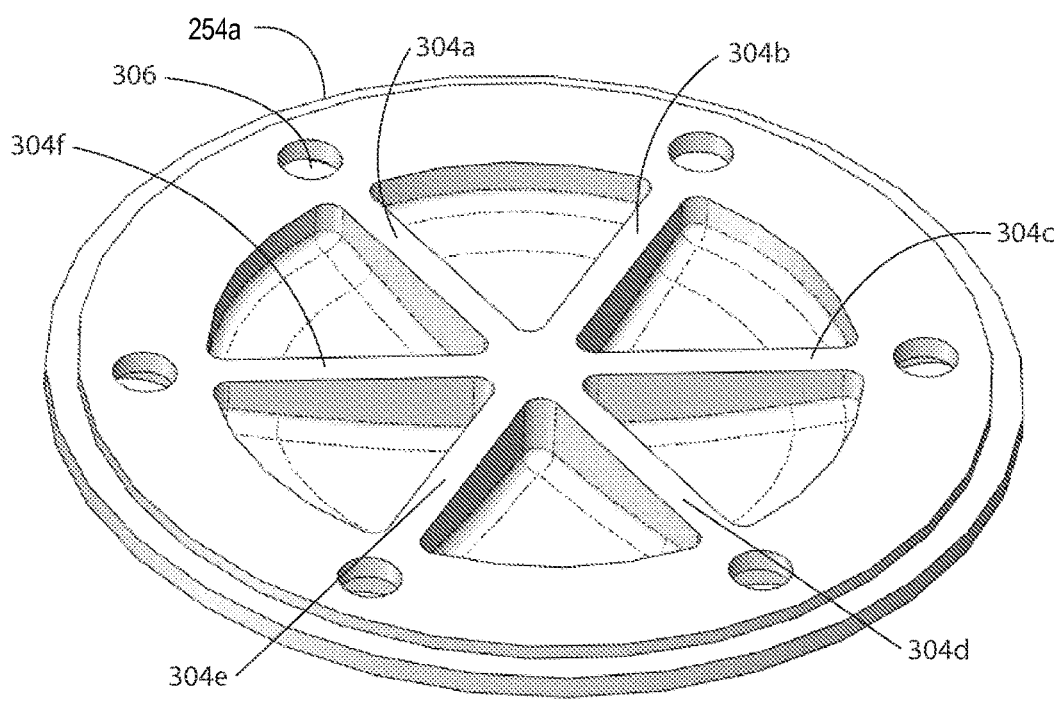

FIGS. 3A and 3B are diagrams illustrating one of the exemplary piston surfaces, specifically the first piston surface 254a, according to one or more embodiments. With reference to FIG. 3A, the piston surface 254a may be generally disk shaped and may include a piston face 302, which faces the wellbore when the acoustic tool is deployed. The outer edges of piston face 302 may be drilled with holes 306 to screw or otherwise mount the surface 254a to the second piston surface 254b. The first piston surface 254a, or at least the piston face 302, may be made from ceramic material to provide stiffness and minimize mass and resonances. The opposite or reverse side of the piston surface 254a is shown in the perspective view of FIG. 3B. As can be seen, the reverse side of the surface 254a may be provided with stiffening bars 304a-304f to further increase the stiffness of the surface 254a and to decrease its weight.

Figure 4:
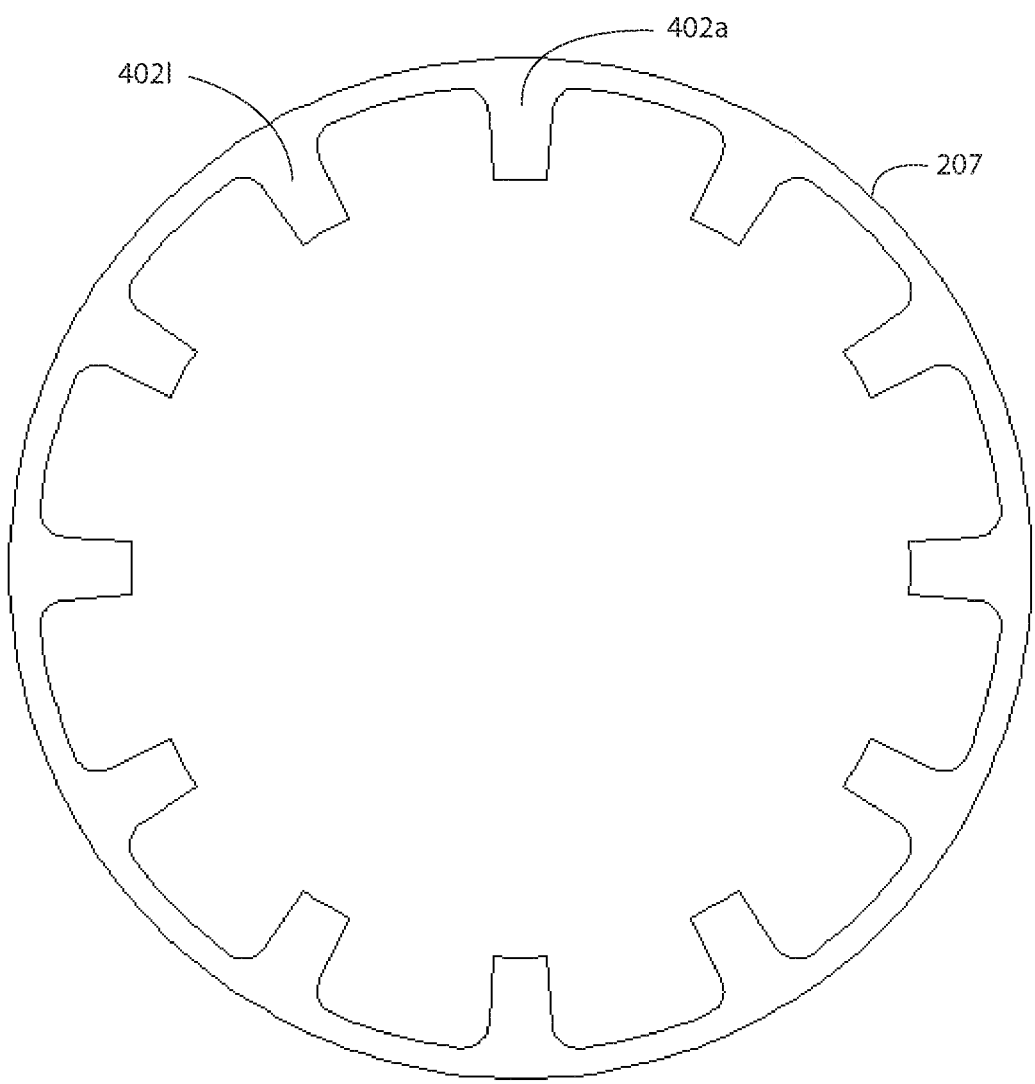
FIG. 4 is a diagram illustrating a centering ring according to one or more embodiments.

With reference back to FIG. 2B, transmitter piston 252 is positioned between first and second solenoid coils 256a and 256b. In one or more embodiments, transmitter piston 252 is held in place by centering spring 257. FIG. 4 shows an exemplary centering spring 257 having inward directed tabs 402a-402l, which can engage a groove in the outer surface of transmitter piston 252. These tabs allow axial movement of the transmitter piston 252 within prescribed limits. Centering spring 257 also positions the transmitter piston 252 at an initial, or rest, position, between solenoid coils 256a, 256b when the coils are not energized. When solenoid coils 256a and/or 256b are energized, centering spring 257 allows the transmitter piston 252 to travel back and forth along longitudinal axis 260. The stiffness of the centering spring 257 can be selected so that the mechanical resonance of the piston 252 acted on by the centering spring 257 is outside an operating frequency range of the transmitter piston 252.

Solenoid coils 256a, 256b may be wound around first and second bobbins 255a and 255b, respectively, arranged in pockets within first and second holding cups 258a and 258b. The bobbins 255a, 255b are advantageously made from a low friction material, such as polyether ether ketone (PEEK) to serve as a bearing for the transmitter piston 252 to ride on. In one or more embodiments, the holding cups 258a, 258b are made from a different material from the transmitter piston 252. In a particular embodiment, the holding cups 258a, 258b are made from a silicon-iron material which reduces eddy current losses that could otherwise generate heat in the transmitter piston 252 and cause a decrease in power efficiency.

When first solenoid coil 256a is energized, the magnetic field generated pulls transmitter piston 252 upward (i.e., "upward" or "downward" is with reference to FIG. 2, not the orientation of the piston in a wellbore), along longitudinal axis 260. As transmitter piston 252 approaches the end of its desired travel, first solenoid coil 256a is de-energized, and second solenoid coil 256b is energized. Solenoid coil 256b then exerts a magnetic pull on transmitter piston 252 downward, along longitudinal axis 260. This causes transmitter piston 252 to slow down and reverse directions, moving past the initial rest point in the direction of second solenoid coil 256b. As transmitter piston 252 reaches the end of its desired travel downward along longitudinal axis 260, the process is reversed and second solenoid coil 256b is de-energized while first solenoid coil 256a is energized.

First and second windows 262a and 262b are provided in the acoustic dipole transmitter 250 to allow the acoustic output from the transmitter piston 252 to travel into the wellbore. The first and second windows 262a, 262b are preferably made of an "acoustically transparent" material that causes little or no attenuation of the acoustic output from the transmitter piston 252. These windows 262a, 262b may be sealed by O-rings 264a & 264b and 266a & 266b housed within annular window frames 273a & 273b and 274a & 274b, respectively. The windows 262a, 262b and the window frames 273a, 273b and 274a, 274b define first and second volumes 275a and 275b, respectively, with the first and second piston surfaces 254a, 254b, the inner surface of the cylinder 251, and the first and second holding cups 258a, 258b.

In some embodiments, the first and second volumes 275a, 275b may be filled with a pressurized acoustic oil, such as a silicone oil. The acoustic output from the transmitter piston 252 travels through the oil through the acoustically transparent windows 262a, 262b and then into the wellbore. The acoustic oil is placed in the volumes 275a, 275b between the transmitter piston 252 and the windows 262a, 262b to balance or equalize the tremendous pressures often experienced in wellbores, which may cause the acoustically transparent windows 262a, 262b to break.

The first and second holding cups 258a, 258b and the housing cylinder 251 of the transmitter piston 252 may further define first and second gaps 261a, 261b therebetween. The acoustic oil, when present, fills these gaps 261a, 261b, too. As the transmitter piston 252 moves under the pull of the coils 256a, 256b, the housing cylinder 251 of the transmitter piston 252 constantly changes the respective sizes of the oil-filled gaps 261a, 261b. Oil paths 268a and 268b provide a path for the acoustic oil to allow the pressurized acoustic oil substantially to equalize the pressure on the piston side of the windows 262a, 262b and the wellbore side. In some embodiments, the cylinder 251 and/or the surfaces 254a, 254b may be coated with a friction reducing material, such as Teflon®, to reduce the energy required to move them through the surrounding acoustic oil.

As the coils 256a, 256b are energized and de-energized, a magnetostrictive effect typically occurs, which can change the physical size of the magnetic materials surrounding the coils. The magnetostrictive effect can introduce unwanted acoustic radiation into the wellbore, making the tool appear more as a uni-polar source rather than a di-polar source of acoustic radiation. To prevent such unwanted acoustic radiation, in some embodiments, a barrier 270 may be provided for the acoustic tool 249. The barrier 270 may be arranged in the acoustic tool 249 between a stainless steel inner housing 271 and an outer housing 272 thereof. Such a barrier 270 may extend generally circumferentially around the acoustic tool 249 and be made of rubber or similar acoustic dampening material, for example.

In another embodiment of the disclosure, as will be discussed further with respect to FIG. 6, an additional or second feedback winding may be provided in addition to the coils 256a, 256b to act as magnetic flux sensors. For example, a single wire turn or multiple wire turns may be wound on the bobbins 255a, 255b in the holding cups 258a, 258b on one or both of the coils 256a, 256b. As the transmitter piston 252 travels along axis 260, the magnetic flux sensed by this feedback winding can allow monitoring in real time of the flux. Sensing the flux allows a control system to measure the amount of force being generated at any time, and to adjust the drive signal accordingly. Sensing the flux also allows determination of whether the transmitter piston 252 is being driven past its saturation point. In one or more implementations, both the piston and the coil holding cups 258a, 258b may be made from magnetic materials having a high flux saturation point. The single wire turn or the multiple wire turns may be wound in coil form and inserted into the coil holding cups 258a, 258b to facilitate assembly.

Figure 6:
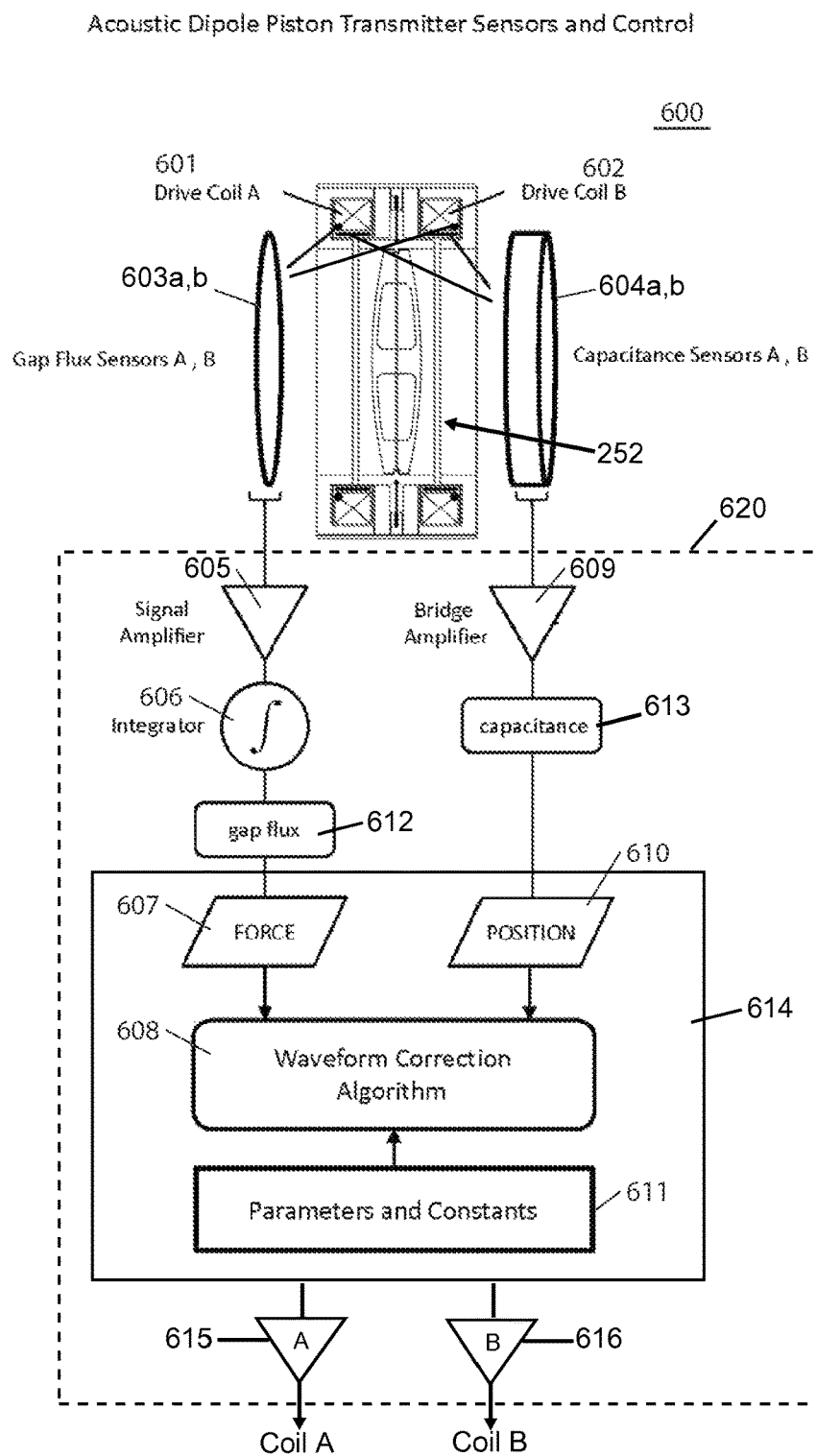
FIG. 6 is a diagram illustrating an acoustic dipole piston transmitter according to one or more embodiments.

In one or more embodiments, as will again be discussed further in FIG. 6, a capacitance sensor may be disposed with at least one of the coils 256a, 256b to monitor the displacement of the transmitter piston 252. For example, the capacitance sensor may be provided by arranging a ring of copper foil on the bobbins 255a, 255b in the holding cups 258a, 258b near the transmitter piston 252. As the transmitter piston 252 is displaced along its axis of travel by the coils being energized and de-energized, the capacitance between the copper ring of the capacitance sensor and the transmitter piston varies. The variation may be used to determine the displacement of the piston and provide adaptive control. The capacitance sensor can also provide a means of calibration when the piston 252 is driven to the extreme end of its range.

Figure 5:
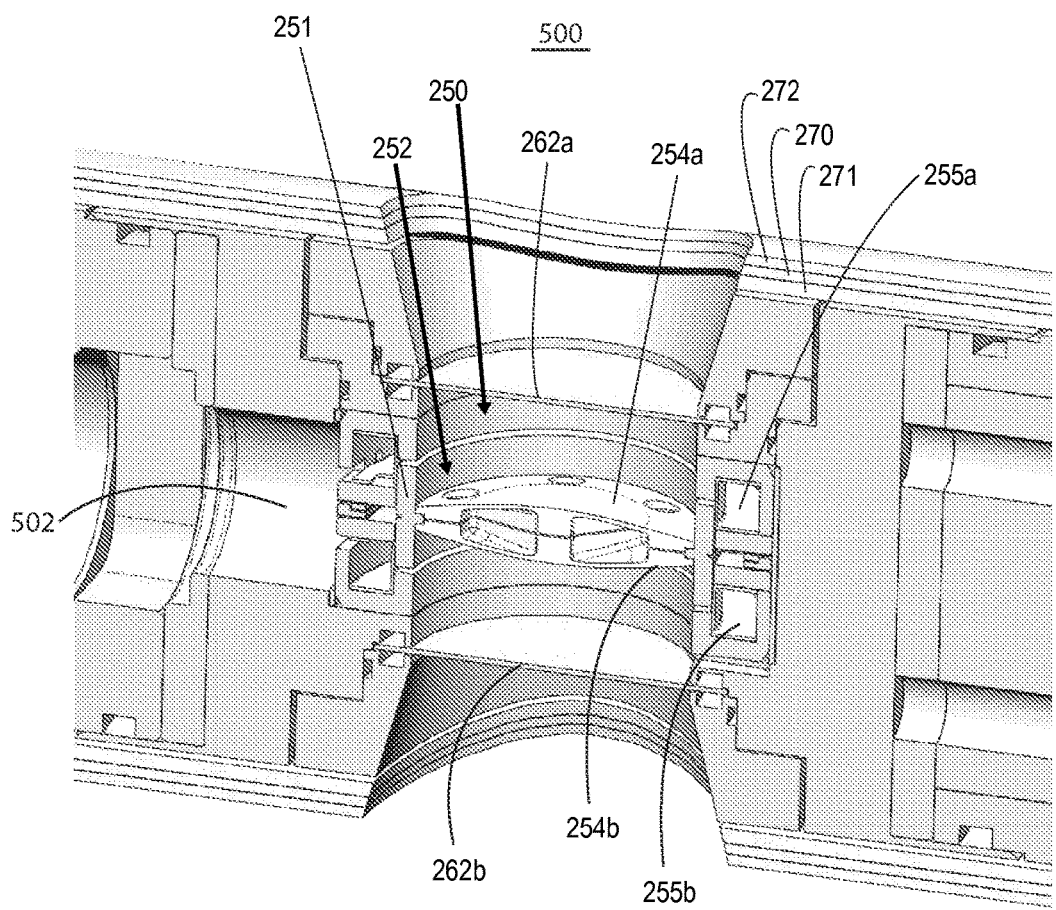
FIG. 5 is a diagram illustrating an acoustic transmitter disposed in a downhole acoustic tool, according to one or more embodiments.

FIG. 5 is a diagram illustrating the acoustic transmitter 250 disposed in a downhole acoustic tool 500, according to one or more embodiments. As can be seen, the transmitter piston 252, including the housing cylinder 251 and piston surfaces 254a, 254b, is again arranged between two coils 256a, 256b that move the piston 252 bi-directionally along a central axis of the housing cylinder 251. The acoustic tool 500 shown here is provided with wireway 502 to allow wires from any on-tool and/or remotely located control system to electronically couple to the coils 256a, 256b and to any sensors, such as the flux winding and the capacitive sensor, of the acoustic transmitter 250.

By driving the transmitter piston 252 using coils 256a, 256b (i.e., instead of permanent magnets), the acoustic dipole transmitter 250 can avoid flux saturation and inherent power limitations that would be experienced by the introduction of permanent magnets. However, driving the transmitter piston 252 involves taking into account the likelihood that the relationship between the force on the transmitter piston 252, created by the magnetic flux in the coils 256a, 256b, and the acceleration of the piston will be non-linear, and cannot necessarily be calculated accurately in the field (i.e., outside a controlled lab environment). Therefore, in some embodiments, the acoustic tool 500 may use feedback from the flux sensor described previously (and shown in FIG. 6) that provides an indicator of the force on the transmitter piston 252, and/or from the capacitance sensor described previously (and shown in FIG. 6) that provides an indicator of the position and/or the displacement of the transmitter piston 252. The feedbacks may then be used to modify the drive signal to the coils 256a, 256b to ensure that the transmitter piston 252 introduces the desired acoustic signal waveform into the subterranean formation (see aforementioned LWD and wireline applications of FIGS. 1A and 1B).

FIG. 6 is a diagram illustrating an exemplary control system and sensors for an acoustic dipole transmitter 600, according to one or more embodiments. In general, the sensors and control system of the acoustic dipole transmitter 600 are designed to drive the transmitter piston in a manner that reduces or eliminates pauses or jerks in the movement of the transmitter piston. Smooth movements and directional changes help avoid ringing or otherwise increasing the total harmonic distortion of the acoustic output. Conversely, a step or sharp increase or decrease in the acoustic output may result in undesired harmonic distortion. To this end, the control system may be designed to energize the solenoid coils so that there is a smooth transition when alternating from driving one coil to the other. For example, in some embodiments, the control system may energize the coils in overlapping time intervals so that one of the coils begins to slow the transmitter piston travel while the other coil is driving the piston in the opposite direction.

As well, in one or more embodiments, the sensors and control system of acoustic dipole transmitter 600 may also be used to determine an initial wave shape and amplitude for the drive signal(s) that will cause the transmitter piston to generate a desired acoustic signal in the wellbore. The determination of the initial wave shape and amplitude may be made according to mathematical relationships between electric current flowing through the solenoid coils, the magnetic flux generated by the coils in response to the current, and the resulting force on and acceleration of the transmitter piston. Additionally, the sensors and control system may also take into account and compensate for non-linearities, such as the dependence of the force on the transmitter piston on the size of the oil-filled gaps. The control system, using information from the flux and capacitance sensors, when included, can compare the calculated displacement of the transmitter piston with the actual displacement. Based on the calculations, the control system can modify, if necessary, the initial wave shape of the drive signal sent to the solenoid coils to cause the transmitter piston to create the desired acoustic signal.

As can be seen in FIG. 6, the transmitter 600 comprises a control system generally indicated at 620 and two solenoid drive coils, drive coil A (601) and drive coil B (602), surrounding a transmitter piston, such as the transmitter piston 252 described previously. The control system 620 may be an on-tool control system included in the transmitter 600 in some embodiments, or it may be a control system that is remotely located with the wireline logging facility 144 (see FIG. 1B) in other embodiments. It is also possible for a portion of the control system 620, for example, a data acquisition portion, to be included in the transmitter 600 and another portion of the control system 620, for example, a data processing portion, to be housed in the wireline logging facility 144.

First and second gap magnetic flux sensors A (603a) and B (603b), each in the form of single-turn or multi-turn windings, for example, are provided with the drive coils A, B. An exploded view of a winding representing the gap flux sensors A, B (603a, b) is provided here for ease of viewing. Similarly, first and second capacitance sensors A (604a) and B (604b), each in the form of a ring of copper foil, for example, are provided with the drive coils A, B. An exploded view of a copper foil ring representing the first and second capacitance sensors A, B (604a, b) is provided here for ease of viewing. Note that although each drive coil 601, 602 has a flux sensor and a capacitance sensor disposed therewith, in some embodiments, it is possible for one of the drive coils to have the flux sensor while the other drive coil may have the capacitance sensor, and vice versa, without departing from the scope of the disclosed embodiments.

In general operation, the flux sensors 603a, 603b detect the magnetic flux in gaps 261a, 261b and provide a combined electric signal representing the magnetic flux to signal amplifier 605 in the control system 620. The signal amplifier 605 outputs an amplified electric signal representing the magnetic flux to an integrator 606. The output signal of integrator 606 is a scalar signal having a level that represents the amount of flux, indicated generally at 612, in gaps 261a, 261b. The gap flux signal 612 is provided to a processor 614 in the control system 620 that calculates the force on the transmitter piston 252 based upon the amount of flux in gaps 261a, 261b. This calculation is performed by the processor 614 in block 607. The calculation performed by the processor 614 in block 607 may be based upon the square law relationship between the force on the transmitter piston 252 and the amount of current in the drive coils 601, 602. In an actual implementation, however, the force on the piston 252 does not necessarily follow the ideal square law relationship, and the processor 614 may compensate for non-linearities, such as may result from the dimensions of air gaps 261a, 261b changing as the piston 252 moves.

The processor 614 may also compensate for any non-linearities resulting from a change in the permeability of the material in the holding cups 258a, 258b (see FIG. 2B) and/or the copper foil rings 604a, 604b. Therefore, the signal from block 607, i.e. the force on the piston 252, is provided as an input to a waveform correction algorithm 608 in the processor 614. The waveform correction algorithm 608 uses parameters and constants provided in block 611, which are system specific, to compensate for the non-linearities resulting from the permeability change. For example, the waveform correction algorithm 608 may take into account the desired gain of the system, the non-linear properties of the materials used, the weight of the piston, and other parameters necessary to calibrate the performance of the system. The constants provided in block 611 may be normalization constants, such as conversion factors to determine units of force which may be needed by the waveform correction algorithm 608.

In a similar manner, capacitance sensors 604*a*, 604*b* provide a combined electric signal representing the capacitance between the copper foil rings of the capacitance sensors and the transmitter piston 252 to bridge amplifier 609. This capacitance typically varies with the amount of displacement of the piston transmitter 252 (i.e., the size of the gaps 261*a*, 261*b*), such that the variation may be used to indicate the position of the transmitter piston. The bridge amplifier 609 outputs a scalar signal having a level that represents the amount of capacitance, indicated generally at 613, to the processor 614. The processor 614 then determines the position of the transmitter piston based on the capacitance obtained from the signal from the bridge amplifier 609. This determination is performed by the processor at block 610. The position information is then provided to the waveform correction algorithm 608 to be used as needed to compensate for any non-linearities as described above.

The processor 614 thereafter generates coil drive waveforms, which have been corrected or compensated for any non-linearities and the like, and provides the waveform to first and second current drives 615 and 616, as explained further in FIG. 7. The current drives 615, 616 may then use the waveforms from the processor 614 to provide drive currents for driving the drive coils 601, 602.

FIG. 7 is a diagram illustrating the acoustic dipole transmitter waveform generation performed by the processor 614 according to one or more embodiments. In this implementation, the processor 614 generates a drive signal in block 703 by multiplying together a sine wave signal, generated in block 701, and an impulse signal generated in block 702. The impulse signal may be a cosine function as shown, though other impulse signals may be used in other embodiments. The impulse signal may vary from zero to some maximum value and then back to zero over a selected period of time. The product of the sine wave and the impulse signal generated in block 703 is split in a waveform split block 704 into two parts, a positive waveform shown in block 705 and an inverted negative waveform shown in block 706. The positive waveform may be provided to drive coil A while the inverted negative waveform may be provided to drive coil B. Thereafter, the split waveforms are then corrected, for example, via the waveform correction algorithm 608 described above, for non-linearities and other system-specific conditions that would cause the piston response to deviate from the idealized square law relationship, for example. The corrected waveforms, depicted in blocks 707 and 708, are then provided to a pre-emphasis filter 709, which provides frequency correction to ensure a flat spectral response, as depicted in blocks 710 and 711. This frequency correction is sometimes referred to as frequency leveling, and generally involves boosting the higher frequencies. The waveforms from blocks 710 and 711 are then passed to an overlap filter 712 that adjusts the waveforms to insure a smooth transition when the piston changes directions. The overlap filter 712 outputs waveforms, depicted in blocks 713 and 714, that energize drive coil A before de-energizing drive coil B, and vice versa, to prevent undesired harmonics in the waveforms, or ringing, which might result from the overlap in the timing of the energization of the drive coils. The waveforms from the overlap filter 712 is then used to control current drive circuits 615 and 616 to thereby energize drive coils A and B, respectively. Voltage drive circuits may also be used instead of current drive circuits in some embodiments, but current drives simplify the waveform generation process because of the proportionality between the current and the coil and the magnetic flux generated. Drive coils A and B then drive the transmitter piston 252 to generate dipole acoustic at block 712. The resulting waveforms, depicted in blocks 614 and 616, are then transmitted into the wellbore.

Accordingly, as set forth above, the embodiments disclosed herein may be implemented in a number of ways. In general, in one aspect, the disclosed embodiments are directed to an acoustic dipole transmitter. The acoustic dipole transmitter comprises, among other things, a piston disposed in the dipole transmitter, at least a portion of the piston being made from a magnetic material. The acoustic dipole transmitter additionally comprises a first coil disposed in the dipole transmitter adjacent to the piston and configured to move the piston in a first direction when energized, and a second coil disposed in the dipole transmitter adjacent to the piston and configured to move the piston in a second direction opposite the first direction when energized.

In one or more embodiments, the acoustic dipole transmitter may further comprise any one of the following features individually or any two or more of these features in combination: (a) feedback winding disposed with at least one of the first and second coils that generates a signal indicative of the amount of magnetic flux in at least one of the first and second coils; (b) capacitance sensor disposed with at least one of the first and second coils that generates a signal indicative of the displacement of the piston; (c) no permanent magnets drive the piston; (d) the piston includes a housing cylinder comprising a cobalt-iron alloy and the first and second coils are housed in an assembly comprising a silicon-iron alloy; (e) the piston is arranged between the first and second coils by a centering spring; (f) the piston is substantially disk shaped with convex first and second opposing surfaces; and (g) a control system for energizing the first and second coils.

In one or more embodiments, the control system may comprise: (1) a first input that amplifies the signal indicative of the amount of magnetic flux in at least one of the first and second coils; (2) a second input that amplifies the signal indicative of the displacement of the piston; (3) a processor connected to the first and second inputs and configured to generate output waveforms for driving the first and second coils; and (4) first and second outputs that energize the first and second coils with output signals reflecting the output waveforms generated by the processor.

In one or more embodiments, the processor may generate the output waveforms by performing one or more of the following using the amplified signals from the first and second inputs: (i) determining a position of the piston relative to the first and second coils; (ii) determining an initial waveform shape; (iii) compensating for discontinuities caused by reversing the direction of piston travel; and (iv) compensating for a non-linearity resulting from a change in drive current and piston acceleration.

In general, in another aspect, the disclosed embodiments are directed to a downhole tool for taking acoustic measurements in a wellbore. The downhole tool comprises, among other things, a tool housing, and an acoustic dipole transmitter disposed at least partially within the tool housing. The piston includes a soft magnetic material and is mounted on a centering spring between a first coil and a second coil. The first coil moves the piston in a first direction when energized and the second coil moves the piston in a second direction opposite the first direction when energized.

In one or more embodiments, the downhole tool may further comprise any one of the following features individually or any two or more of these features in combination: (a) a feedback winding disposed with at least one of the first or second coils that provides a signal indicative of an amount of force on the piston created by the first and second coils; (b) a capacitance sensor disposed with at least one of the first or second coils that provides a signal indicating a position of the piston relative to the first and second coils; (c) the tool housing includes an acoustic dampening material; and (d) a control system for energizing the first and second coils.

In one or more embodiments, the control system may comprise: (1) a first input that amplifies the signal indicative of the amount of magnetic flux in at least one of the first and second coils; (2) a second input that amplifies the signal indicative of the position of the piston relative to the first and second coils; (3) a processor connected to the first and second inputs and configured to generate output waveforms for driving the first and second coils; and (4) first and second outputs that energize the first and second coils with output signals reflecting the output waveforms generated by the processor.

In one or more embodiments, the processor generates the output waveforms for driving the first and second goals by performing one or more of the following using the amplified signals from the first and second inputs: (i) determining a position of the piston relative to the first and second coils; (ii) determining an initial waveform shape; (iii) compensating for discontinuities caused by reversing the direction of piston travel; and (iv) compensating for a non-linearity resulting from a change in drive current and piston acceleration.

In general, in yet another aspect, the disclosed embodiments are related to a method for transmitting acoustic signals into a subterranean formation of an oil and gas well. The method comprises, among other things, the steps of positioning an acoustic dipole transmitter in a wellbore of the oil and gas well, the acoustic dipole transmitter including a piston made at least partially from a magnetic material. The method additionally comprises the steps of energizing a first coil in the acoustic dipole transmitter to move the piston in a first direction, de-energizing the first coil, energizing a second coil in the acoustic dipole transmitter to move the piston in a second direction opposite the first direction, and de-energizing the second coil.

In one or more embodiments, the method for transmitting acoustic signals may further comprise any one of the following features individually or any two or more of these features in combination: (a) multiplying a sine wave signal and an input signal to generate an output waveform and using the output waveform to energize the first and second coils; (b) splitting the output waveform into a positive waveform and an inverted negative waveform and using the positive waveform to energize the first coil and the inverted negative waveform to energize the second coil; (c) compensating the split waveforms for non-linearities resulting from a change in coil current and/or piston acceleration; and (d) the first coil is de-energized before energizing the second coil, and the second coil is de-energized before energizing the first coil.

While the disclosed embodiments have been described with reference to one or more particular implementations, those skilled in the art will recognize that many changes may be made thereto without departing from the spirit and scope of the description. Accordingly, each of these embodiments and obvious variations thereof is contemplated as falling within the spirit and scope of the claims.

What is claimed is:

1. An acoustic dipole transmitter, comprising:
   a piston disposed in the dipole transmitter, at least a portion of the piston being made from a magnetic material;
   a first coil disposed in the dipole transmitter adjacent to the piston, the first coil moving the piston in a first direction when energized;
   a second coil disposed in the dipole transmitter adjacent to the piston, the second coil moving the piston in a second direction opposite the first direction when energized; and
   a feedback winding disposed with at least one of the first and second coils that generates a signal indicative of the amount of magnetic flux in at least one of the first and second coils.

2. An acoustic dipole transmitter according to claim 1, further comprising a capacitance sensor disposed with at least one of the first and second coils that generates a signal indicative of the displacement of the piston.

3. An acoustic dipole transmitter according to claim 1, further comprising:
   a capacitance sensor disposed with at least one of the first and second coils that generates a signal indicative of the displacement of the piston.

4. An acoustic dipole transmitter according to claim 1, wherein no permanent magnets drive the piston.

5. An acoustic dipole transmitter according to claim 1, wherein the piston includes a housing cylinder comprising a cobalt-iron alloy and the first and second coils are housed in an assembly comprising a silicon-iron alloy.

6. An acoustic dipole transmitter according to claim 1, wherein the piston is arranged between the first and second coils by a centering spring.

7. An acoustic dipole transmitter according to claim 1, wherein the piston is substantially disk shaped with convex first and second opposing surfaces.

8. An acoustic dipole transmitter according to claim 1, further comprising a control system for energizing the first and second coils, the control system comprising:
   a first input that amplifies the signal indicative of the amount of magnetic flux in at least one of the first and second coils;
   a second input that amplifies the signal indicative of the displacement of the piston;
   a processor connected to the first and second inputs and configured to generate output waveforms for driving the first and second coils by performing one or more of the following using the amplified signals from the first and second inputs:
     determining a position of the piston relative to the first and second coils;
     determining an initial waveform shape;
     compensating for discontinuities caused by reversing the direction of piston travel;
     compensating for a non-linearity resulting from a change in drive current and piston acceleration; and
   first and second outputs that energize the first and second coils with output signals reflecting the output waveforms generated by the processor.

9. A downhole tool for taking acoustic measurements in a wellbore, the downhole tool comprising:
   a tool housing; and
   an acoustic dipole transmitter disposed at least partially within the tool housing and having a piston including a soft magnetic material, the piston being mounted on a centering spring between a first coil and a second coil, the first coil moving the piston in a first direction when energized and the second coil moving the piston in a second direction opposite the first direction when energized and a feedback winding disposed with at least one of the first and second coils that generates a signal indicative of the amount of magnetic flux in at least one of the first and second coils.

10. A downhole tool according to claim 9, wherein the acoustic dipole transmitter further comprises a capacitance sensor disposed with at least one of the first or second coils that provides a signal indicating a position of the piston relative to the first and second coils.

11. A downhole tool according to claim 9, wherein the acoustic dipole transmitter further comprises:
 a capacitance sensor disposed with at least one of the first or second coils that provides a signal indicative of a position of the piston relative to the first and second coils.

12. A downhole tool according to claim 9, wherein the tool housing includes an acoustic dampening material.

13. A downhole tool according to claim 9, wherein the acoustic dipole transmitter further comprises a control system for energizing the first and second coils, the control system comprising:
 a first input that amplifies the signal indicative of the amount of magnetic flux in at least one of the first and second coils;
 a second input that amplifies the signal indicative of the position of the piston relative to the first and second coils;
 a processor connected to the first and second inputs and configured to generate output waveforms for driving the first and second coils by performing one or more of the following using the amplified signals from the first and second inputs:
   determining a position of the piston relative to the first and second coils;
   determining an initial waveform shape;
   compensating for discontinuities caused by reversing the direction of piston travel;
   compensating for a non-linearity resulting from a change in drive current and piston acceleration; and
 first and second outputs that energize the first and second coils with output signals reflecting the output waveforms generated by the processor.

14. A method for transmitting acoustic signals into a subterranean formation of an oil and gas well comprising:
 positioning an acoustic dipole transmitter in a wellbore of the oil and gas well, the acoustic dipole transmitter including a piston made at least partially from a magnetic material;
 energizing a first coil in the acoustic dipole transmitter to move the piston in a first direction;
 de-energizing the first coil;
 energizing a second coil in the acoustic dipole transmitter to move the piston in a second direction opposite the first direction;
 de-energizing the second coil; and
 generating a signal indicative of the amount of magnetic flux in at least one of the first and second coils.

15. The method according to claim 14, further comprising multiplying a sine wave signal and an input signal to generate an output waveform and using the output waveform to energize the first and second coils.

16. The method according to claim 15, further comprising splitting the output waveform into a positive waveform and an inverted negative waveform and using the positive waveform to energize the first coil and the inverted negative waveform to energize the second coil.

17. The method according to claim 14, further comprising compensating the split waveforms for non-linearities resulting from a change in coil current and/or piston acceleration.

18. The method according to claim 14, wherein the first coil is de-energized before energizing the second coil, and the second coil is de-energized before energizing the first coil.

* * * * *